July 14, 1925. 1,546,178

A. MILLER ET AL

ROTARY FURNACE

Filed Jan. 11, 1923    8 Sheets-Sheet 2

July 14, 1925.

A. MILLER ET AL

ROTARY FURNACE

Filed Jan. 11, 1923    8 Sheets-Sheet 3

Inventors
ABNER MILLER.
DAVID H. MILLER.
By Hazard & Miller
Attorneys.

July 14, 1925.　　　　A. MILLER ET AL　　　　1,546,178
ROTARY FURNACE
Filed Jan. 11, 1923　　　8 Sheets-Sheet 5

Inventors
ABNER MILLER.
DAVID H. MILLER.
By Hazard & Miller
Attorneys

Patented July 14, 1925.

1,546,178

UNITED STATES PATENT OFFICE.

ABNER MILLER AND DAVID H. MILLER, OF LOS ANGELES, CALIFORNIA, ASSIGNORS TO METAL SUPPLY CO., OF LOS ANGELES, CALIFORNIA, A CORPORATION OF CALIFORNIA.

ROTARY FURNACE.

Application filed January 11, 1923. Serial No. 611,971.

*To all whom it may concern:*

Be it known that we, ABNER MILLER and DAVID H. MILLER, citizens of the United States, residing at Los Angeles, in the county of Los Angeles and State of California, have invented new and useful Improvements in Rotary Furnaces, of which the following is a specification.

This invention relates to rotary smelting furnaces, and has for an object to provide a furnace having a rotatively and tiltably mounted furnace chamber. Another object is to provide power actuated means acting automatically to impart intermittent rotative steps in one direction to the chamber so that it is rotated about its axis. Another object of the invention is to provide a tiltable carriage upon which the furnace chamber is rotatively mounted and whereby certain of the supporting rollers upon which the chamber rests also form supports preventing axial movement of the chamber when it is tilted. Another object is to provide hydraulically operative means for actuating the chamber tilting mechanism and for actuating the chamber rotating mechanism, and in this connection it is an object to provide a single master valve for controlling the tilting and rotating mechanisms.

Other objects and advantages will be made manifest in the following specification of an embodiment of the invention illustrated in the accompanying drawings, wherein.

The invention is shown as including a drum or chamber 2 of any desired pattern or construction and which, in the present case, is shown as open at each end, and these ends are preferably of conical form to provide a collecting pocket in the chamber when the same is arranged horizontally. At one end of the apparatus there is arranged any suitable burner B from which flames of combustion are directed into the chamber.

The chamber is mounted for rotation when it is in a horizontal position upon sets of rollers. At one end there is provided a pair of rollers 3, one of which is provided with a shaft 4 journaled in boxes 5 arranged on a suitable framework. The other roller 3 is provided with a tubular hub 6 bearing on a rock shaft 7 passing through bearing boxes 5. The contiguous end of the furnace chamber 2 is provided with a circumferential track 8 bearing on the rollers 3 when the chamber is horizontal. The opposite end of the chamber is rotatively mounted on rollers 10 which are shown as flanged, and these support the contiguous end of the chamber by engagement with a peripheral track 11 thereon; the flanges of the rollers 10 overlapping the edges of the track 11 and serving for the purpose of preventing axial movement of the chamber when the latter is tilted, as will now be described.

The rollers 10 are mounted by short axles 12 in bearing boxes 13 which are shown as secured upon parallel transverse beams 14 which are cross connected solidly at the ends by pillars 15. Around these pass substantial U-bolts 16, the lower ends of which pass through clamp plates 17. The pillars 15 are provided with co-axial trunnions 18 which are supported in end bearings 19 which in turn are mounted upon parallel girder sections 20 between which girder sections the carriage-like structure 14 is suspended pivotally.

The foundation frame sections 20 are secured upon parallel foundation sills 21 which are firmly supported upon the top edges of substantial walls 22 forming a pit 23 in which certain operating mechanism to be described is arranged.

Figure 6:
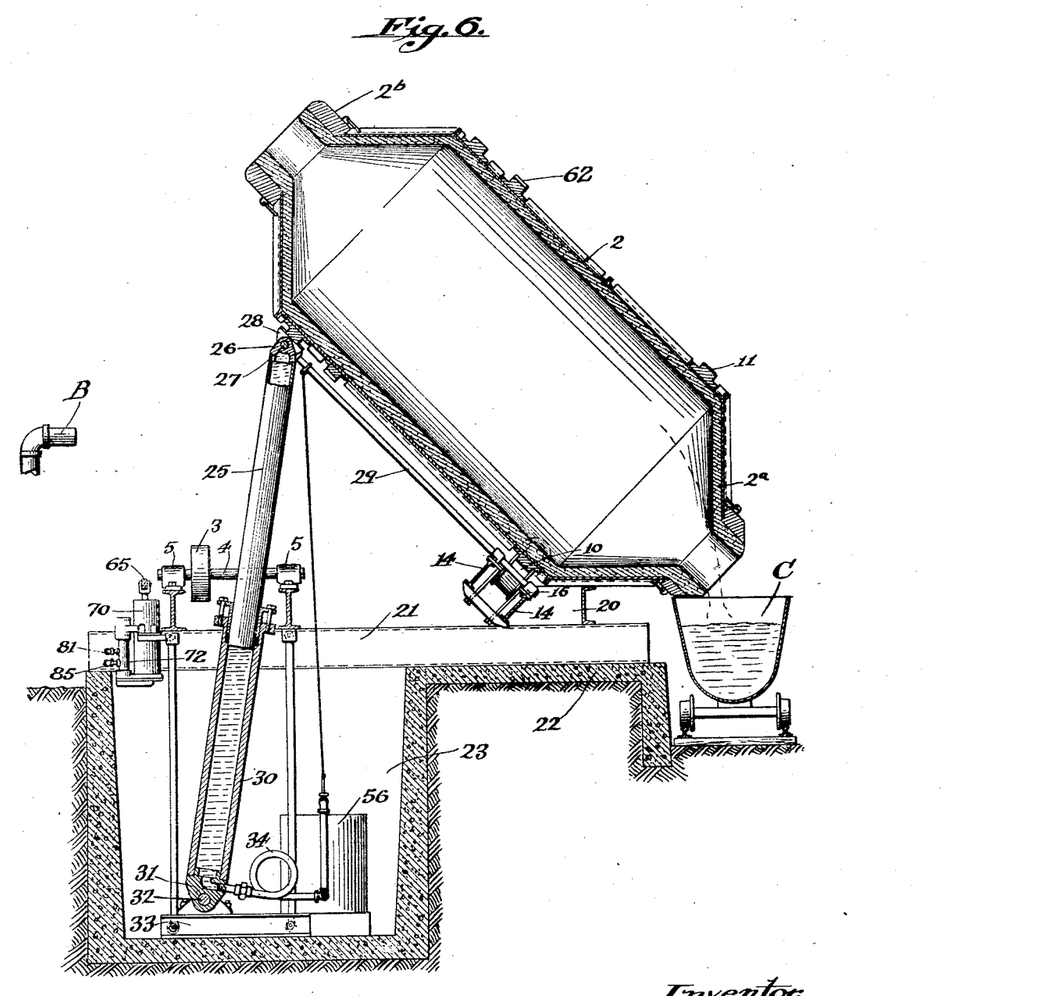
Fig. 6 is a vertical sectional view showing the furnace chamber in the dumping position.

It will be seen, therefore, that one end, the discharging end 2ª, of the chamber is tiltable on the trunnions 18 as pivots and the front or charging end 2ᵇ of the chamber is adapted to be elevated swinging in an arc on the axis of the trunnions 18. The discharging end 2ª of the chamber and the charging end 2ᵇ are shown as conical and converge outwardly providing ample openings for charging and discharging. By providing a chamber 2 which is tiltable on an axis at one end of the chamber, it will be seen that the discharge mouth of the discharge head 2ª will move downwardly in an arc as indicated by the dotted lines in Fig. 6, having a substantially vertical chord, and, therefore, this will facilitate the dumping of the smelted contents of the furnace into a contiguous portable bucket or receptacle C. This substantially vertical movement of the discharging mouth facilitates also the speed of discharge of the contents and regulates the line of flow so that the contents can be accurately discharged.

Figure 1:
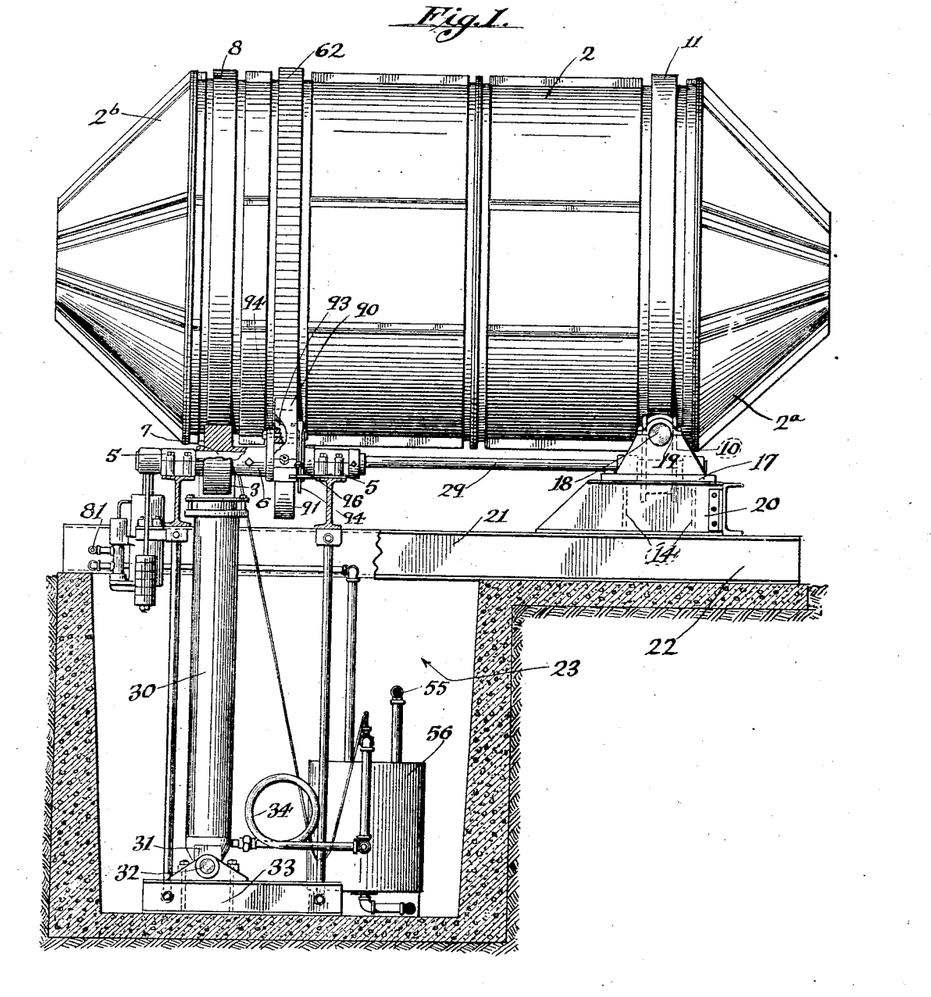
Figure 1 is a side elevation of the furnace illustrating in section a contiguous pit in which a portion of the mechanism is arranged.
Figure 2:
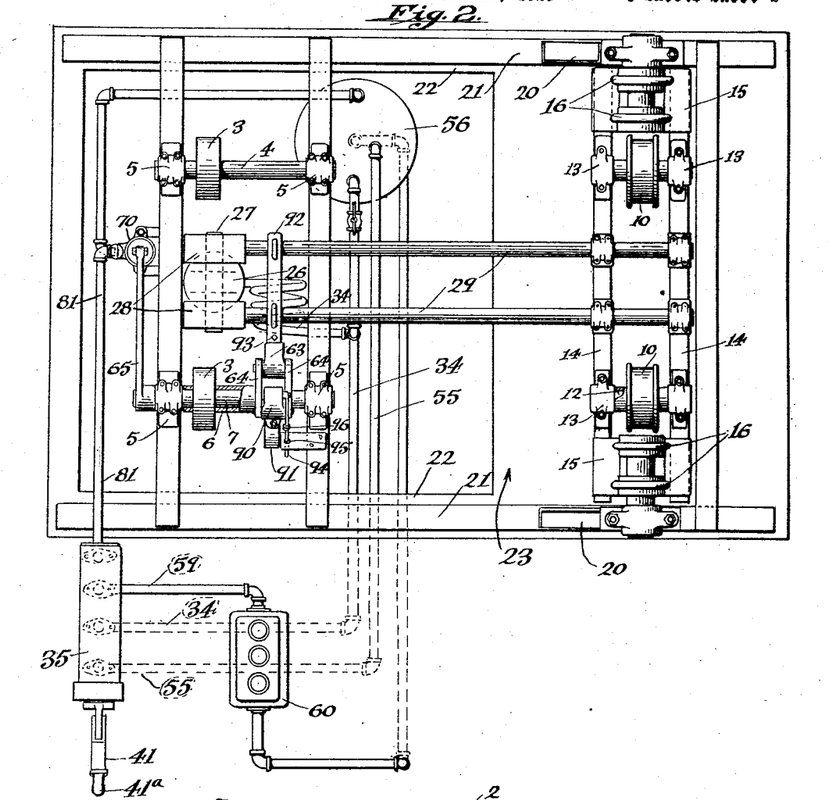
Fig. 2 is a plan of the tiltable carriage, the furnace chamber being omitted in this view.
Figure 3:
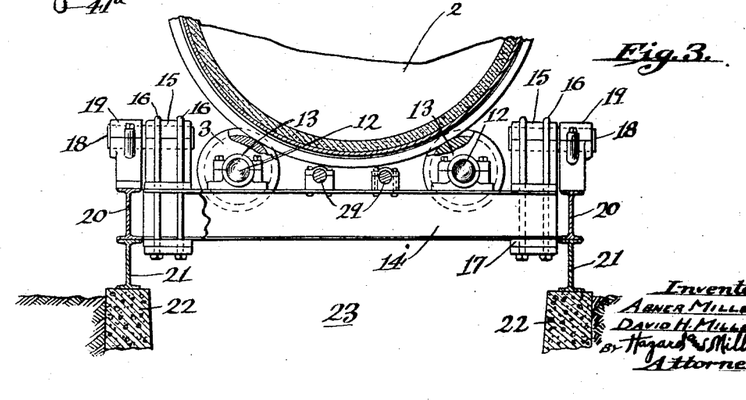
Fig. 3 is an end view and partial section showing a fragment of the chamber resting on its carriage.

A mechanism is provided for elevating the chamber to discharge the contents, and preferably such mechanism is of hydraulic character and is shown, in the present form, as consisting of a piston 25, the upper end of which is pivotally connected by a head 26 to a substantial transverse pivot pin 27. This is supported at its ends in what might be termed bed blocks 28 laterally spaced on the sides of the head 26. These bed blocks 28 form means engageable with the contiguous lower portion of the track 8 of the chamber and support the swinging end of the chamber when it is raised and lowered. The blocks 28 are here shown as connected to the contiguous ends of substantial parallel radius rods 29 which extend rearwardly beneath the chamber 2 and are solidly connected to the transverse carriage beams 14, Fig. 2. The piston is slidable in a cylinder 30 extending down into the pit 23 and which is pivoted by a foot block 31 on a trunnion 32 provided therefor in a bed frame 33.

The operation of the piston 25 is preferably secured hydraulically as by the admission of liquid, preferably oil, from a suitable pump and under control of a manually operable master valve. The foot block 31 is connected by a supply pipe 34 to the master valve which comprises a body 35 having a bore 36 in which is operable a balanced piston valve having heads 37 and 37' spaced by a spindle 37ª. The piston valve is provided with a stem 38 passing through a stuffing box 39 in one end of the valve body 35 and being connected pivotally at 40 to a lever 41. The lower end of this lever is connected at 42 to a link 43 which in turn is connected to a pivot 44 in a fixed support 45.

The operating lever 41 is provided with a grip handle 41ª in which is a latch or detent 46 normally pressed downward to engage with a notched fixed position rod 47. The notches of this rod form an index as well as a retaining means to hold the lever 41 in its several positions, three in the present case.

A feature of the invention is to provide a master valve operable for controlling the passage of operating fluid therefrom to different apparatuses at respectively different degrees of pressure, and to that end the valve body 35 is provided with a relief valve 49 yieldingly pressed to a seat 50 by a spring 51. The seat 50 opens into one end of the valve bore 36, the remote portion of this bore being provided with an escape or by-pass or passage 51' leading into an escape duct 52 extending longitudinally of the valve body 35 and thence by a transverse passage 53 into the opposite end of the valve bore 36 which is provided with a free discharge port 54. This port is connected by a pipe 55 to a collecting drum 56 arranged at the bottom of the pit 23.

Figure 7:
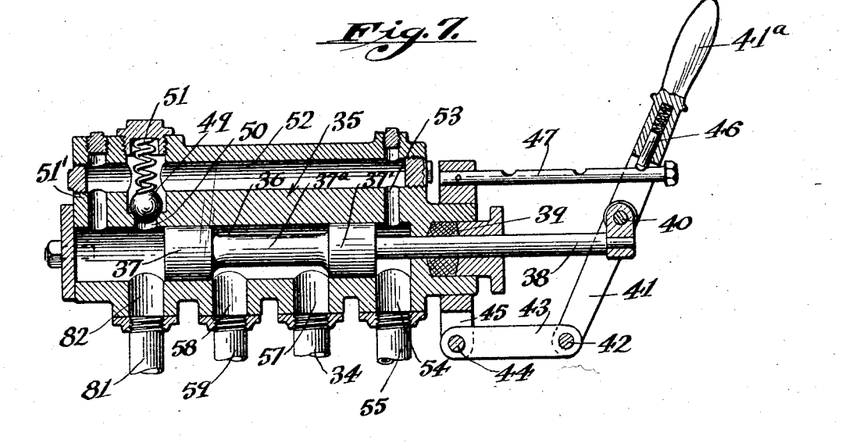
Fig. 7 is a longitudinal section of the master valve showing it in furnace dumping position.
Figure 8:
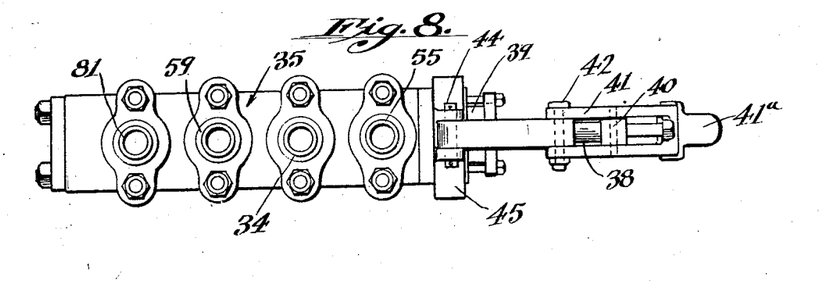
Fig. 8 is a bottom view of the valve of Fig. 7.

The hydraulic lift supply pipe 34 is attached to the master valve body at a port 57, and contiguous to this is a main supply port 58 to which is attached a supply pipe 59 leading to a suitable source of pressure which preferably is a pump 60 which may be arranged at the head of the pit. To secure the operation of the lift piston 25, the operating lever 41 is pulled to its outermost position, as shown in Fig. 7, so that the valve heads 37 and 37' straddle the inlet port 58 and the port 57 so that pressure of oil from the pump 60 is directed to the pipe 34 and this conducts the fluid to the cylinder 30 wherein it becomes operative upon the piston 25 and the bed blocks 28 are forced up against the bottom of the furnace chamber and this is gradually lifted to the uppermost, tilting position and the contents thereof are discharged into the receptacle or bucket C. To restore the chamber to the horizontal smelting position, the valve lever 41 is thrown into the intermediate notch of the notched rod 47 and the valve head 37' is shifted inwardly so as to pass the port 57 and open communication between the inlet port and the exhaust port 54 through which the fluid is discharged under pressure of the piston 25 coming down back to the collecting drum 56. The inward movement of the valve piston in the body 35 is rendered easy by the escape of oil beyond the head 37 through the by-pass 51' to the duct 52 and thence to the outlet 54.

It will be seen that any desired degree of pressure of fluid can be transmitted as from the pump 60 to the elevating or lift piston 25.

It is one of the objects of the present invention to provide not only a simple form of smelting furnace, but to provide one which requires no water jacket and which can be effectively operated economically and produce efficacious smelting results which have been demonstrated by actual construction and use of the apparatus in the reduction of ores. To secure economical, rapid and efficacious operation, it is desirable that the furnace 2 be rotated, preferably at a low rate of speed during the smelting of the ore, and an effective and simple means is utilized in the present invention for which purpose the furnace rotating means includes a toothed band 62 surrounding the furnace and which is adapted, when the furnace is in horizontal position, to be engaged by the operating mechanism to rotate the chamber.

The rotating means includes a substantial dog 63 which is shown as pivoted on a short lever arm 64 of the rock shaft 7 above described. On one end of this rock shaft there is attached a lever arm 65, the swinging end of which is connected at 66 to the upper end of an adjustable link 67 which is connected to a wrist pin 68 in a hollow piston 69. This piston is operative in a cylinder 70 and forms an engine which when fluid pressure is applied, will rock the lever 65 and its rock shaft 7.

Preferably, the rock shaft actuating engine just described is operative automatically after it is once started by the adjustment of the master lever 41 of the valve structure 35. To that end the chamber rotating engine is provided with an automatic valve mechanism including a piston 71 reciprocating in a cylinder 72 and having a somewhat reduced body 73 and a piston head 74 on one end. The opposite end of the piston 71 is provided with a larger piston head 75 operating in a cylinder 76, the lower portion of which has a cross passage 77 leading into the mediate portion of the engine cylinder 70. The engine piston 69 is provided at its upper end with one or more escape ports 78. When the piston 69 is in the uppermost position, Fig. 10, fluid passes through the cross port 77 in under the piston head 75 of the engine valve and this is lifted to the position shown in Fig. 10. When the piston 69 is in its lowermost position, fluid gravitates from below the piston 75 in the chamber 76 through the bleed ports 78 then registering with the cross port 70 77 where the excess oil will accumulate in the piston and cylinder 70 and be conveyed away as may be desired. Any leakage oil escaping past the piston 75 is led by a tube 79 to the top of the cylinder 70.

The engine valve cylinder 72 is provided with a supply connection 80 leading into the cylinder 72 at a point just below the inner end of the cylinder body 71 when this is in the position shown in Fig. 9. A supply pipe 81 leads from the connection 80 to an outlet port 82 in the master valve 35, and when the master lever 41 is shifted to the innermost position and is locked by the detent 46 at the inner notch of the rod 47, fluid passes under pressure from the pump into the port 58 and between the valve heads 37 and 37' and out of the port 82 through the supply pipe 81 to the cylinder 72 of the engine valve. The reduced portion 73 of the piston 71, when the latter is in its lower position, uncovers the mouth of a duct 83 leading down the side of the cylinder 72 and into an end duct 84 which discharges into the engine cylinder 70 below the piston 69. Therefore, pressure of fluid from the pump is exerted upon the piston 69 and this, moving upwardly, swings the lever 65 and rotates the rock shaft 7. This causes the dog 63 to be forced against the rack teeth of the band 62 and the chamber is given a slight degree of rotation.

Figure 9:
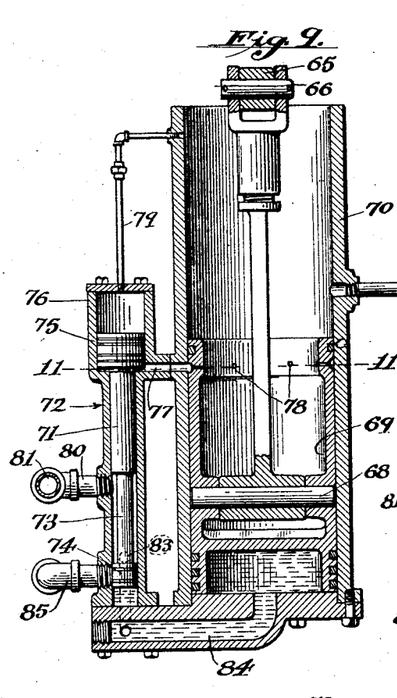
Fig. 9 is a central vertical section of the dog operating engine piston showing the parts thereof in piston driving position.
Figure 10:
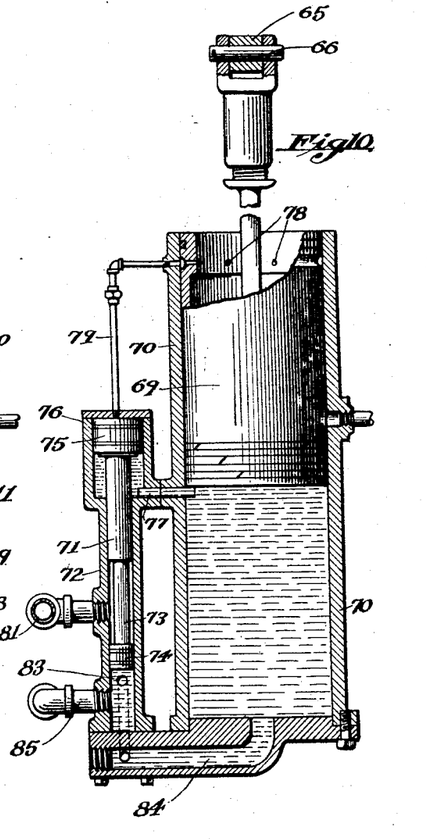
Fig. 10 is a vertical section showing the dog operating engine piston in uppermost position with the automatic valve thereof in exhausting position.
Figure 11:
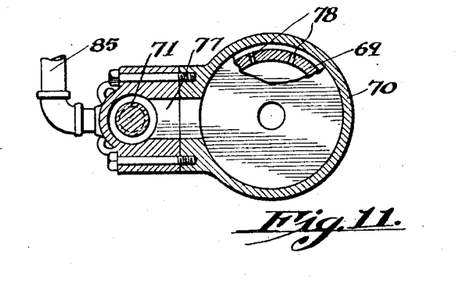
Fig. 11 is a cross section on line 11—11 of Fig. 9.
Figures 12, 13:
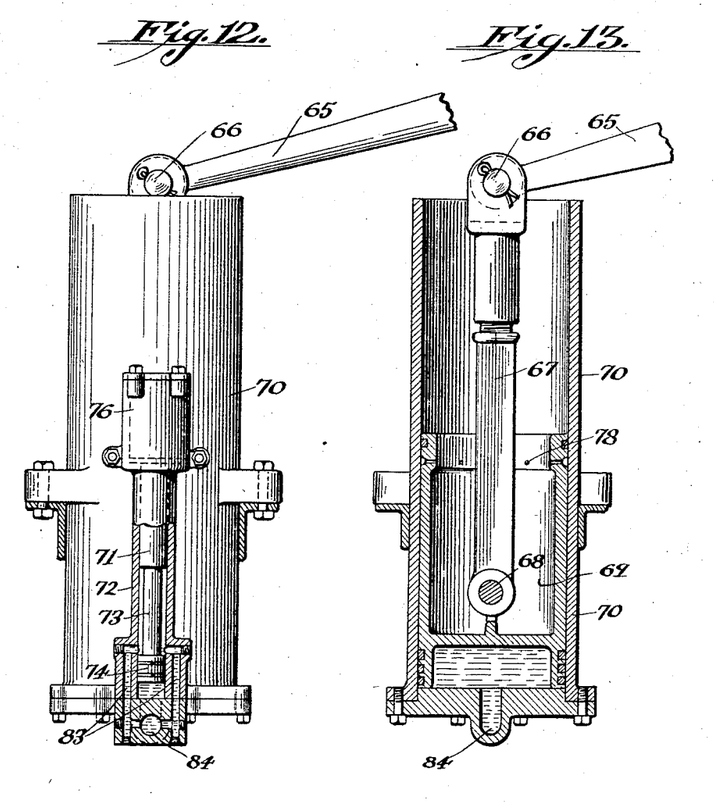
Fig. 12 is a side elevation of the furnace rotating engine piston showing its valve chamber in section.
Fig. 13 is a central longitudinal section on a plane at right angles to Fig. 10.
Figure 14:
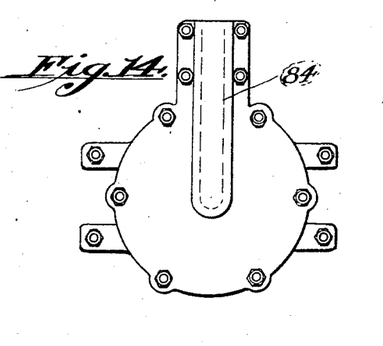
Fig. 14 is a bottom plan of the engine shown in Fig. 12.

As the piston 69 reaches its uppermost position and uncovers the cross port 77, pressure passes in under the piston head 75 and the piston is shifted from the supply position, Fig. 9, to the cut off position, Fig. 10, at which time the smaller piston head 74 rises past the mouth of duct 83 and shuts off the pressure supply to the piston 69. The smaller piston 74 uncovers the transfer duct 83 and the weight of the piston 69 becomes effective to expel the operative liquid in the cylinder 70 through the passageway 84 and the duct 83 into the lower portion of the valve cylinder 72 and to which is connected a discharge or exhaust pipe 85 returning the spent liquid to the collecting drum 56.

While it may be desirable to provide for the transmission of a high pressure to the tiltable furnace through the supply pipes 34—59 from the master valve 35, it is not necessary to utilize such a high degree of pressure in operating the chamber rotating dog 63. Therefore, when the valve heads 37—37' are shifted over to establish communication between the supply port 58 and the outlet port 82, fluid pressure passes to the engine supply pipe 81 and the degree of pressure therein is automatically controlled by the relief valve 49 which is at this time subjected to the pressure of a liquid passing from the port 58 to the port 82. The relief valve 49 may be adjusted to yield at a pressure, for instance sixty-five pounds, and, therefore that degree of pressure may be transmitted to the furnace rotating engine, any excess of pressure being prevented by the opening of the relief valve 49 which permits a by-pass of the fluid through the duct 52 and to the exhaust outlet 54.

The chamber rotating dog 63 is mounted so that it is effective upon the furnace chamber while in the horizontal position, and the chamber may be lifted away upwardly from the rotating dog when pressure is turned into the lift cylinder 30.

Figures 4, 5:
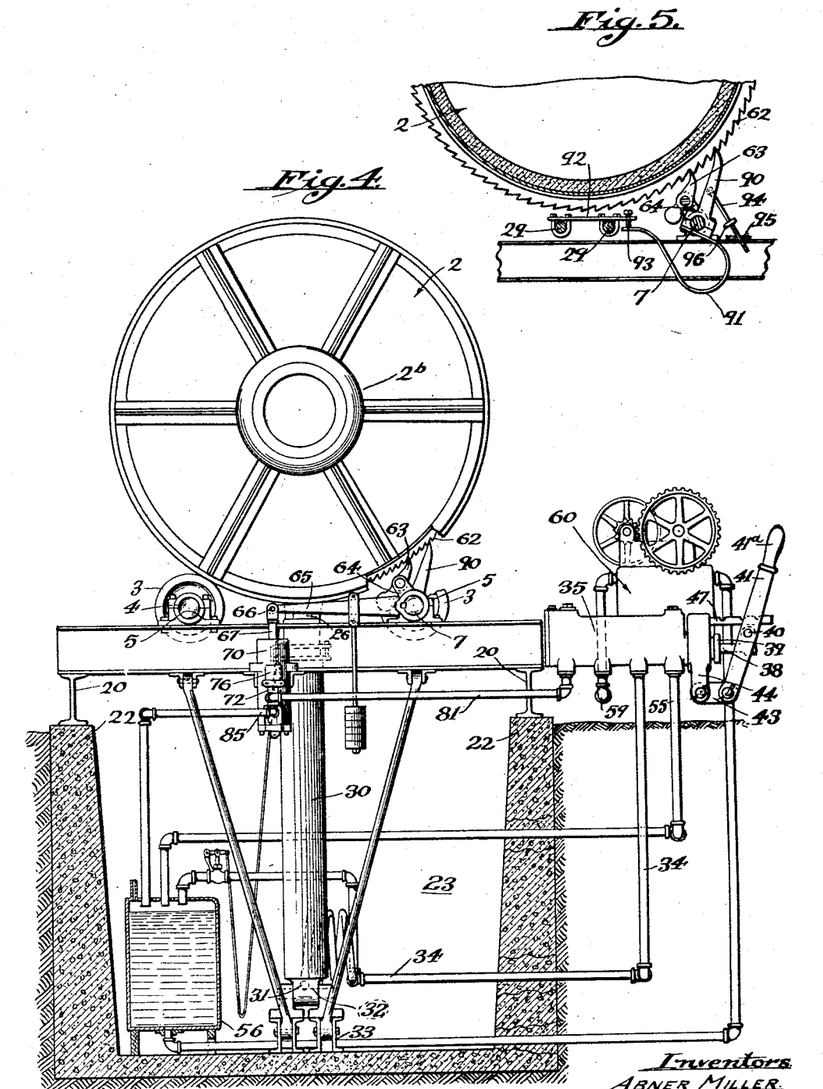
Fig. 4 is an end view of the apparatus, parts being shown in section.
Fig. 5 is a detail view showing the rotating dog and the locking latch for the furnace chamber.

A locking device is provided for preventing reverse action of the chamber 2, and this is shown as consisting of a latch 90 which is pivoted on the rock shaft 7 of the dog. The latch 90 is normally thrown into effective locking position by engagement with the rack band 62, this being accomplished as by means of a spring 91 attached to the latch 90 and having an arm or end portion extending in toward the radius rods 29 which are shown in Fig. 5 as provided with a cross piece 92 in which is threaded an adjusting screw 93 designed to engage the spring when the carriage and the furnace are lowered to horizontal position. This causes a reaction of the spring 91 which throws the latch 90 inwardly against the toothed band 62 as the furnace comes into position. As the furnace is lifted the spring 91 is released from the adjusting screw 93 and the latch 90 swings outwardly to a limited position so as to clear the band 62. To limit the movement of the latch it is shown as provided with a sliding pin 94 which is guided in a fixed eye 95 conveniently mounted on the permanent structure. On the pin 94 is an adjustable shoulder 96 designed to engage the eye 95 when the latch falls to its outermost position. It will be seen therefore that we have provided a locking latch which will automatically clear the toothed band 62 as the furnace chamber is elevated and the latch will be automatically restored to proper position after the chamber has been lowered to horizontal position and the spring 91 has been engaged and contracted sufficiently to restore the latch 90 into locking engagement with the band 62.

It will be seen from the above that the invention provides a very simple and practicable form of smelting furnace in which many of the parts are of small tho substantial construction and can be, when the apparatus is dismantled, compactly nested and prepared for transportation which is specially a desirable characteristic in apparatus of this kind, it being an object of the invention to provide for the transportation of the knocked-down apparatus to a mine or mill site and there erecting the same so that the ore can be smelted at the mine or mill on a mining site, and thereby entirely overcome the expensive transportation incident to the moving of the ore with a large proportion of utterly waste rock to a remote smelter.

It is well known that numerous extensive ore deposits are unworked because of the expense not only of mining the product, but of transporting the ore in bulk to and by rail transportation to a smelter.

The furnace of this invention is constructed of peripheral, and if desired longitudinal sections as are also the charging and discharging heads. This sectional form of construction enables the production of a furnace chamber in comparatively small sections of such weight that each or numbers of them can be conveniently hauled over difficult trails to mining sites at which the brought-in sectional apparatus can be readily erected and operations started.

It has been demonstrated that the rotation of a furnace during the smelting is extremely economical and effective since it prevents the melting metal and the slag from stratifying before the ore body has been thoroughly reduced as the ore mass is constantly agitated and turned over repeatedly during the smelt.

Figure 15:
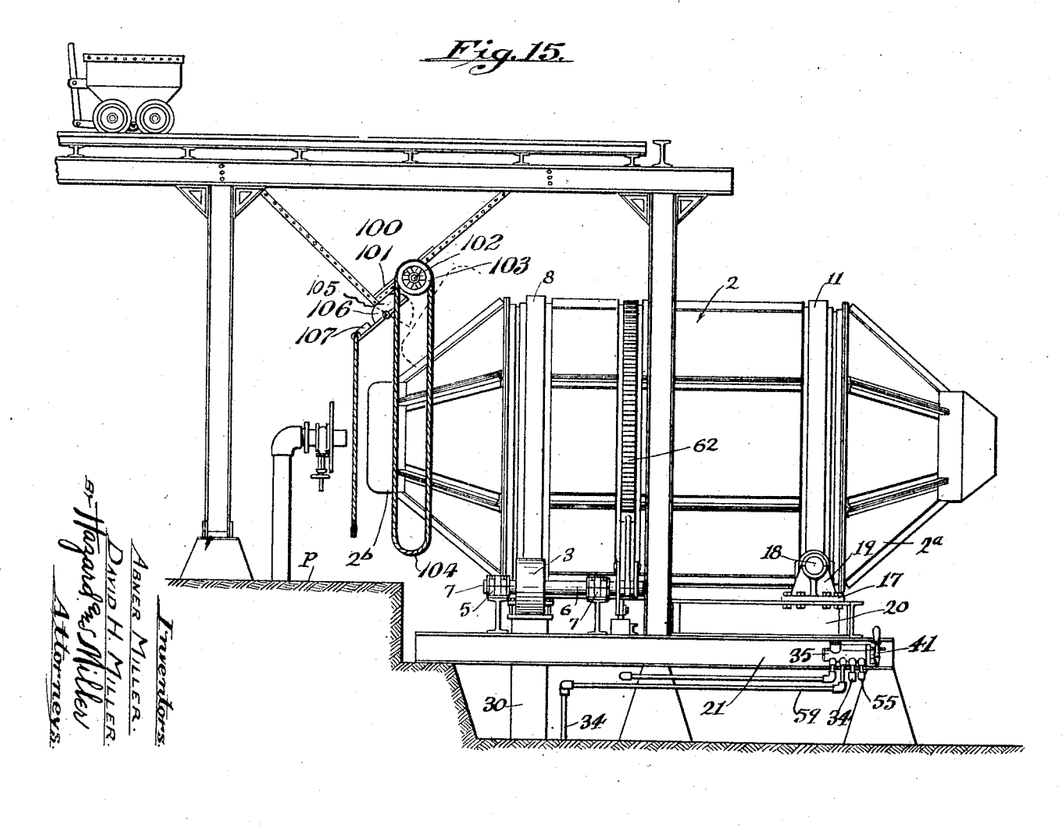
Fig. 15 is a side elevation of the drum and the loader.

A feature of the invention is the organization in combination with the tiltable drum 2, of means for facilitating the charging thereof so as to produce a substantially level and uniform layer of the ore in the bottom of the drum, and in the present case when the drum is partially elevated, as is shown in dotted lines in Fig. 15, the angle of the bottom of the drum will be such that the ore will accumulate along the bottom in a substantially uniform layer. Above the charging end of the drum is provided a feed hopper 100 in the bottom of which is a suitable closure shown as a sliding gate 101 which is operative by a pinion secured on a shaft 102 having a pulley wheel 103. The hopper is of a downwardly convergent form and its discharge outlet is normally closed by the gate 101, this being opened from the operator's platform P as by means of a hand rope 104 extending up over the pulley 103.

When the drum 2 has been lifted to the dotted line position, Fig. 15, and the gate 101 is opened, the crushed ore or other material will gravitate from the bottom of the hopper and will be guided into the open charging mouth as by a chute 105 pivoted at 106 on the lower corner of the hopper. The chute is of automatic operation in closing action and is normally maintained in closed position as by a weighted arm 107. As the ore runs from the bottom of the hopper it will engage the upwardly inclined chute 105 and this will be thrown to the dotted line charging position and direct the material into the hopper.

It will be seen that by this arrangement of loading the careful deposit of the material along the bottom of the inclined hopper is readily secured in a practical and rapid manner without any direct or manual handling.

Further embodiments, modifications and changes may be resorted to within the spirit of the invention as here claimed.

What is claimed is:

1. A rotary furnace having in combination a rotary furnace chamber, a stationary rotatable support for one end thereof, a tiltable rotatable carriage having means to rotatably support the furnace, and means for tilting the carriage.

2. A rotatable furnace having in combination a rotatable furnace chamber, a tiltable carriage having rollers to support one end of the chamber, fixed rollers engaging another portion of the chamber, and means for tilting the carriage, the rollers mounted thereon and thereby the furnace chamber.

3. A rotary furnace having in combination a fixed frame, fixed rollers mounted thereon, a tiltable carriage, rollers on said carriage, a rotary furnace chamber supported by all the rollers above mentioned when in normal position, bed blocks to engage the furnace, and means to elevate the bed blocks and tilt the carriage, thereby tilting the furnace.

4. A rotary furnace having in combination a fixed frame, fixed rollers mounted thereon, a tiltable carriage, rollers on said carriage, a rotary furnace chamber supported by all the rollers above mentioned when in normal position, bed blocks to engage the furnace, radius rods between the bed blocks and tiltable carriage, and means to elevate the bed blocks and tilt the carriage, thereby tilting the furnace.

5. A rotary furnace having in combination a fixed frame, fixed rollers mounted thereon, a tiltable carriage, rollers on said carriage, a rotary furnace chamber supported by all the rollers above mentioned when in normal position, bed blocks to engage the furnace, radius rods between the bed blocks and tiltable carriage, a fluid operated piston engaging the bed blocks to elevate the blocks, tilt the carriage and thereby tilt the furnace.

6. In a smelting apparatus, a rotatively supported smelting chamber, a tiltable carriage upon which the chamber is supported, power actuated mechanism for tilting the chamber on one end, and power actuated mechanism operative when the chamber is in its lower position for rotating the chamber in intermittent steps.

7. In a smelting apparatus, a rotatively supported smelting chamber, a tiltable carriage upon which the chamber is supported, power actuated mechanism for tilting the chamber on one end, and power actuated mechanism operative when the chamber is in its lower position for rotating the chamber in intermittent steps progressively in one direction.

8. In a smelting apparatus, a rotatively supported smelting chamber, means for tilting the chamber, and means for imparting rotary movement to the chamber and operative only while the chamber is in a horizontal position.

9. In a smelting apparatus, a rotatively supported smelting chamber, means for tilting the chamber, means for imparting rotary movement to the chamber and operative only while the chamber is in a horizontal position, and a latching means to prevent reverse rotation of the chamber.

10. In a smelting apparatus, a rotatively supported smelting chamber, means for tilting the chamber, means for imparting rotary movement to the chamber and operative only while the chamber is in a horizontal position, a latching means to prevent reverse rotation of the chamber, and a device for releasing the latching means as the chamber is tilted upwardly and for returning the latching means to effective position when the chamber is lowered.

11. A rotary furnace having in combination a rotatably supported furnace chamber, means to rotatably support the furnace, a rack, a pawl engaging said rack, a fluid operated piston to operate the pawl to move the rack and thereby rotate the furnace, and a fluid operated piston to tilt the furnace.

12. A smelting apparatus comprising, in combination, a rotatively supported smelting chamber, fluid operative means for rotating the chamber, fluid operated means for tilting the chamber, and a single master valve for controlling selectively the rotating means and the tilting means.

13. A smelting apparatus comprising, in combination, a rotatively supported smelting chamber, fluid operative means for rotating the chamber, and fluid operated means for tilting the chamber, said chamber rotating means being automatically operative in its action after it is initially started to impart successive rotary impulses to the said chamber.

14. In a smelting apparatus, a furnace chamber rotatively and tiltably supported, a fluid pressure operative means for rotating the chamber, a fluid pressure operative means for tilting the chamber, a source of fluid pressure, and a master valve for selectively controlling the action of the fluid pressure operative means.

15. In a smelting apparatus, a furnace chamber rotatively and tiltably supported, a fluid pressure operative means for rotating the chamber, a fluid pressure operative means for tilting the chamber, a source of fluid pressure, and a master valve for selectively controlling the action of the fluid pressure operative means, said master valve providing for the supply of fluid pressure at different degrees to the respective means.

In testimony whereof we have signed our names to this specification.

DAVID H. MILLER.
ABNER MILLER.